(12) United States Patent
Kajimoto (10) Patent No.: US 12,537,911 B2
(45) Date of Patent: Jan. 27, 2026

(54) VIDEO PROCESSING APPARATUS

(71) Applicant: DENSO TEN Limited, Hyogo (JP)

(72) Inventor: Nobuaki Kajimoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 18/819,189

(22) Filed: Aug. 29, 2024

(65) Prior Publication Data

US 2025/0080692 A1    Mar. 6, 2025

(30) Foreign Application Priority Data

Aug. 31, 2023 (JP) ................. 2023-141445

(51) Int. Cl.
*H04N 7/01* (2006.01)
*H04N 5/265* (2006.01)

(52) U.S. Cl.
CPC ............ *H04N 7/013* (2013.01); *H04N 5/265* (2013.01)

(58) Field of Classification Search
CPC ...... H04N 5/265; H04N 5/272; H04N 23/951; H04N 7/013
See application file for complete search history.

(56) References Cited

U.S. PATENT DOCUMENTS

| | | | |
|---|---|---|---|
| 9,294,711 B2* | 3/2016 | Shirani | H04N 7/012 |
| 2007/0181687 A1* | 8/2007 | Fukushima | H04N 23/68 |
| | | | 348/E5.045 |
| 2013/0271650 A1* | 10/2013 | Muto | H04N 21/440218 |
| | | | 348/E7.003 |
| 2014/0267924 A1* | 9/2014 | Kametani | H04N 7/0127 |
| | | | 348/715 |
| 2020/0404192 A1* | 12/2020 | Sakurai | B60R 1/27 |
| 2022/0060655 A1* | 2/2022 | Ohmura | H04N 7/181 |

FOREIGN PATENT DOCUMENTS

| | | | |
|---|---|---|---|
| JP | 2013213859 A | * | 10/2013 |
| JP | 2017-081445 A | | 5/2017 |

* cited by examiner

*Primary Examiner* — Peet Dhillon
(74) *Attorney, Agent, or Firm* — Oliff PLC (57) ABSTRACT

A video processing apparatus includes: a microcomputer that performs following two processes on a first video signal from a camera, and outputs processed first video signal as a second video signal; i) superimposing an image that assists driving of a vehicle on the first video signal, and ii) converting a frame rate of the first video signal into a frame rate for a display; and a controller that receives the first video signal and receives the second video signal, in a first case where the second video signal is input to the controller, the controller outputting the second video signal to the display, and in a second case where the second video signal is not input to the controller or not updated, the controller converting a frame rate of the first video signal into the frame rate for the display to output the converted first video signal to the display.

5 Claims, 5 Drawing Sheets

VIDEO PROCESSING APPARATUS

BACKGROUND OF THE INVENTION

Field of the Invention

The invention relates to a video processing apparatus, an in-vehicle camera system, and a video processing method.

Description of the Background Art

Conventionally, there has been an in-vehicle camera system that displays a video taken from behind the vehicle on a display in a vehicle. In such a system, when an abnormality occurs in a microcomputer (hereinafter, referred to as a main microcomputer) that performs image processing on the video taken by a camera, there has been proposed a technology that prevents video interruption by directly displaying the video to be input from the camera on the display.

However, in the conventional technology, when the abnormality occurs in the main microcomputer, there has been room for improvement in displaying an appropriate video on the display. In the main microcomputer, a process of converting a frame rate of the video taken by the camera into a frame rate for the display is performed. On the other hand, when the abnormality occurs in the main microcomputer, there is a risk that the video having a frame rate different from the frame rate for the display is output to the display and such a video may not be displayed properly.

SUMMARY OF THE INVENTION

According to one aspect of the invention, a video processing apparatus including: a microcomputer configured to perform following two processes on a first video signal input from a camera, and output processed first video signal as a second video signal; i) superimposing an image that assists driving of a vehicle on the first video signal, and ii) converting a frame rate of the first video signal into a frame rate for a display; and a controller configured to receive the first video signal from the camera and receive the second video signal from the microcomputer, in a first case in which the second video signal is input to the controller, the controller outputting the second video signal to the display, and in a second case in which the second video signal is not input to the controller or not updated, the controller converting a frame rate of the first video signal received from the camera into the frame rate for the display to output the converted first video signal to the display.

It is an object of the invention to provide a video processing apparatus, an in-vehicle camera system, and a video processing method capable of displaying an appropriate video on a display even when an abnormality occurs in a main microcomputer.

These and other objects, features, aspects and advantages of the invention will become more apparent from the following detailed description of the invention when taken in conjunction with the accompanying drawings.

DESCRIPTION OF THE EMBODIMENTS

An embodiment of a video processing apparatus, an in-vehicle camera system, and a video processing method disclosed in the present application will be described in detail below with reference to the accompanying drawings. This invention is not limited to the embodiment described below.

Figure 1:
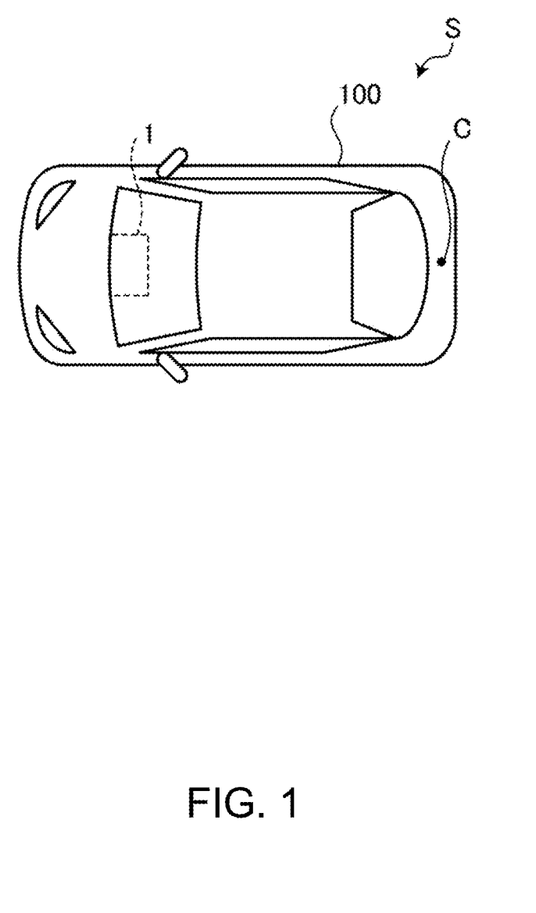
FIG. 1 illustrates a mounting example of an in-vehicle camera system.

First, a mounting example of the in-vehicle camera system according to the embodiment will be described. FIG. 1 illustrates the mounting example of the in-vehicle camera system. As illustrated in FIG. 1, an in-vehicle camera system S according to the embodiment is mounted in a vehicle 100.

As illustrated in FIG. 1, the in-vehicle camera system S includes a video processing apparatus 1 and a camera C. The video processing apparatus 1 includes a display 40 described later with reference to FIG. 2 and functions as a display audio of the vehicle 100. The video processing apparatus 1 includes a function of displaying a video taken by the camera C on a display when the vehicle 100 is in a reverse gear.

The camera C is installed so as to capture an image around the vehicle 100. The camera C captures the image around the vehicle 100 and outputs a video signal to the video processing apparatus 1. An example of FIG. 1 illustrates a case in which the camera C is installed so as to capture a rear image of the vehicle 100. The in-vehicle camera system S may include a plurality of the camera C that captures around the vehicle 100.

Figure 2:
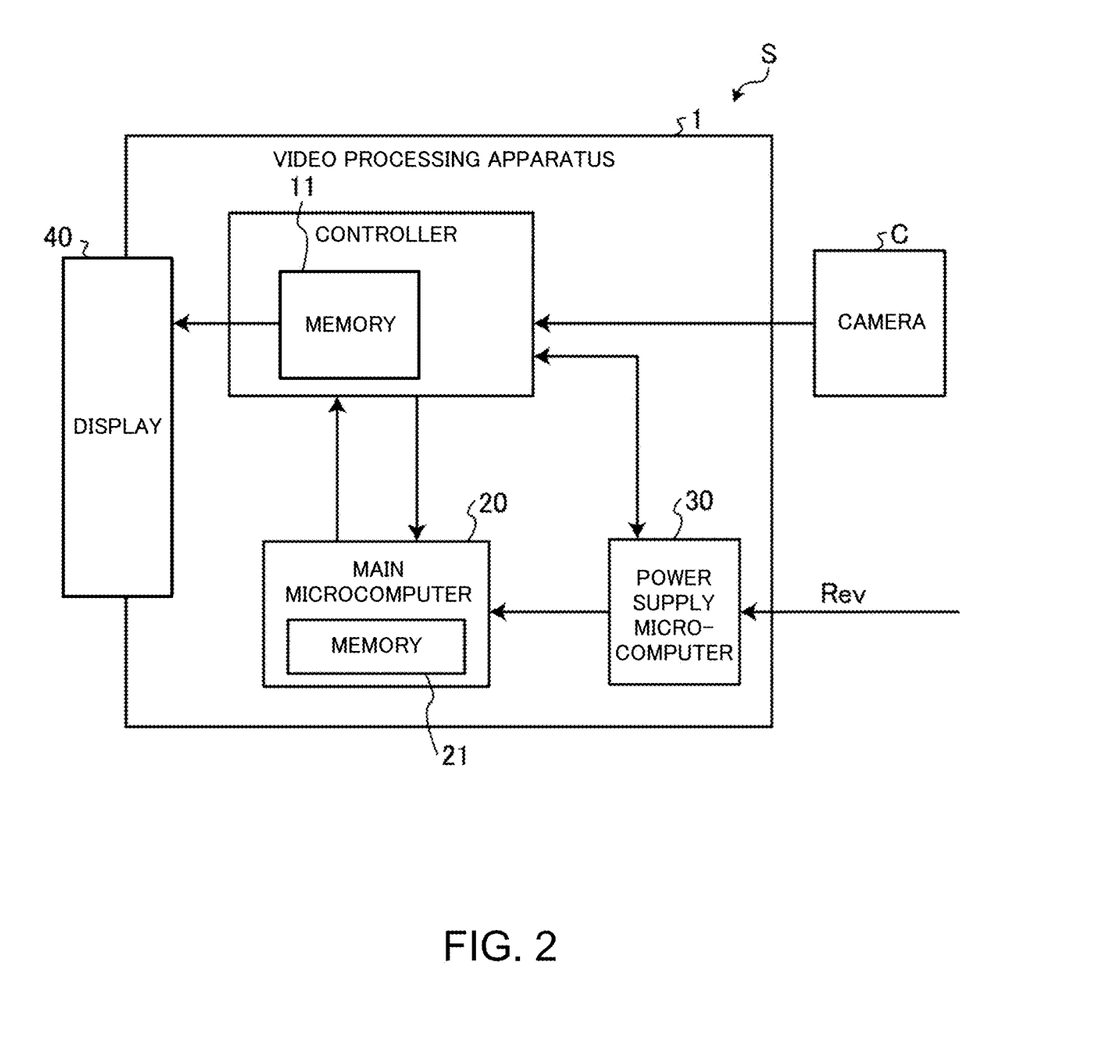
FIG. 2 is a block diagram of a video processing apparatus.

Next, a configuration example of the video processing apparatus 1 according to the embodiment will be described with reference to FIG. 2. FIG. 2 is a block diagram of the video processing apparatus 1. As illustrated in FIG. 2, the video processing apparatus 1 includes a controller 10, a main microcomputer 20, a power supply microcomputer 30, and the display 40.

The controller 10 is, for example, a video IC, and includes a memory 11. The controller 10 performs various processing for displaying the video signal to be input from the camera C on the display 40. As described later, the controller 10 determines an abnormality of the main microcomputer 20, controls a multiplexer (MUX) (not shown) according to a determination result, and switches a signal path of the video signal to be input from the camera C.

When the controller 10 does not output and display the video signal to be input from the camera C on the display 40, the controller 10 outputs and displays other video signals than the video signal to be input from the camera C (i.e., video signals of videos of a navigation screen, a television screen, a DVD screen, an audio screen, etc.) on the display 40.

The main microcomputer 20 is, for example, a system on a chip (SoC) and includes a memory 21. After the main microcomputer 20 has applied various image processing to the video signal to be input from the controller 10 by the memory 21, the main microcomputer 20 outputs the video signal after the image processing to the controller 10.

The main microcomputer 20 generates other video signals than the video signal to be input from the camera C (i.e., video signals of videos of a navigation screen, a television screen, a DVD screen, an audio screen, etc.) and outputs the generated video signals to the controller 10.

The power supply microcomputer 30 is a microcomputer that controls a power supply of the video processing apparatus 1. The power supply microcomputer 30 receives an accessory switch (ACC) signal of the vehicle and turns on/off power supplies of the controller 10 and the main microcomputer 20.

The power supply microcomputer 30 receives a reverse signal Rev of the vehicle and causes the controller 10 and the main microcomputer 20 to perform the following processing when the reverse signal Rev is high, that is, when the vehicle 100 is in the reverse gear. More specifically, the power supply microcomputer 30 outputs a camera switching signal to the main microcomputer 20 during a period in which the reverse signal Rev is high. During a period in which the main microcomputer 20 receives the camera switching signal, the main microcomputer 20 receives and outputs the video signal from and to the controller 10, and causes the controller 10 to output and display the video signal that has been received from the main microcomputer 20 on the display 40.

The power supply microcomputer 30 receives the reverse signal Rev of the vehicle. When the reverse signal Rev is low, that is, when the vehicle 100 is in a state other than the reverse gear, the power supply microcomputer 30 causes the main microcomputer 20 to generate the video signals of a navigation screen, a television screen, a DVD screen, an audio screen, etc., and output the generated video signals to the controller 10.

When the power supply microcomputer 30, as described later, receives from the controller 10 a signal of notifying that there is an abnormality in the main microcomputer 20, the power supply microcomputer 30 resets the main microcomputer 20. Instead of resetting the main microcomputer 20 by the power supply microcomputer 30, the controller 10 that has detected that there is an abnormality in the main microcomputer 20 may directly reset the main microcomputer 20.

The display 40 is, for example, a thin film translator liquid crystal (TFT). The display 40 displays the video corresponding to the video signal to be input from the controller 10. The video processing apparatus 1 may cause an external display outside the video processing apparatus 1 to display the video.

As described above, the in-vehicle camera system S causes the display 40 to display the video obtained by applying the image processing on the video from the camera C when the reverse signal Rev of the vehicle is high, that is, the vehicle 100 is in the reverse gear. The in-vehicle camera system S causes the display 40 to display the videos of a navigation screen, a television screen, a DVD screen, an audio screen, etc., when the reverse signal Rev of the vehicle is low, that is, the vehicle 100 is in a state other than the reverse gear.

Next, the signal path of the video signal will be described with reference to FIG. 3. Hereinafter, the video to be displayed on the display 40 at a normal state of the main microcomputer 20 is referred to as a "normal camera video", and the video to be displayed on the display 40 in the abnormality of the main microcomputer 20 is referred to as a "bypass camera video". The video signal to be input from the camera C to the controller 10 corresponds to a first video signal, and the video signal to be input from the main microcomputer 20 to the controller 10 corresponds to a second video signal.

Figure 3:
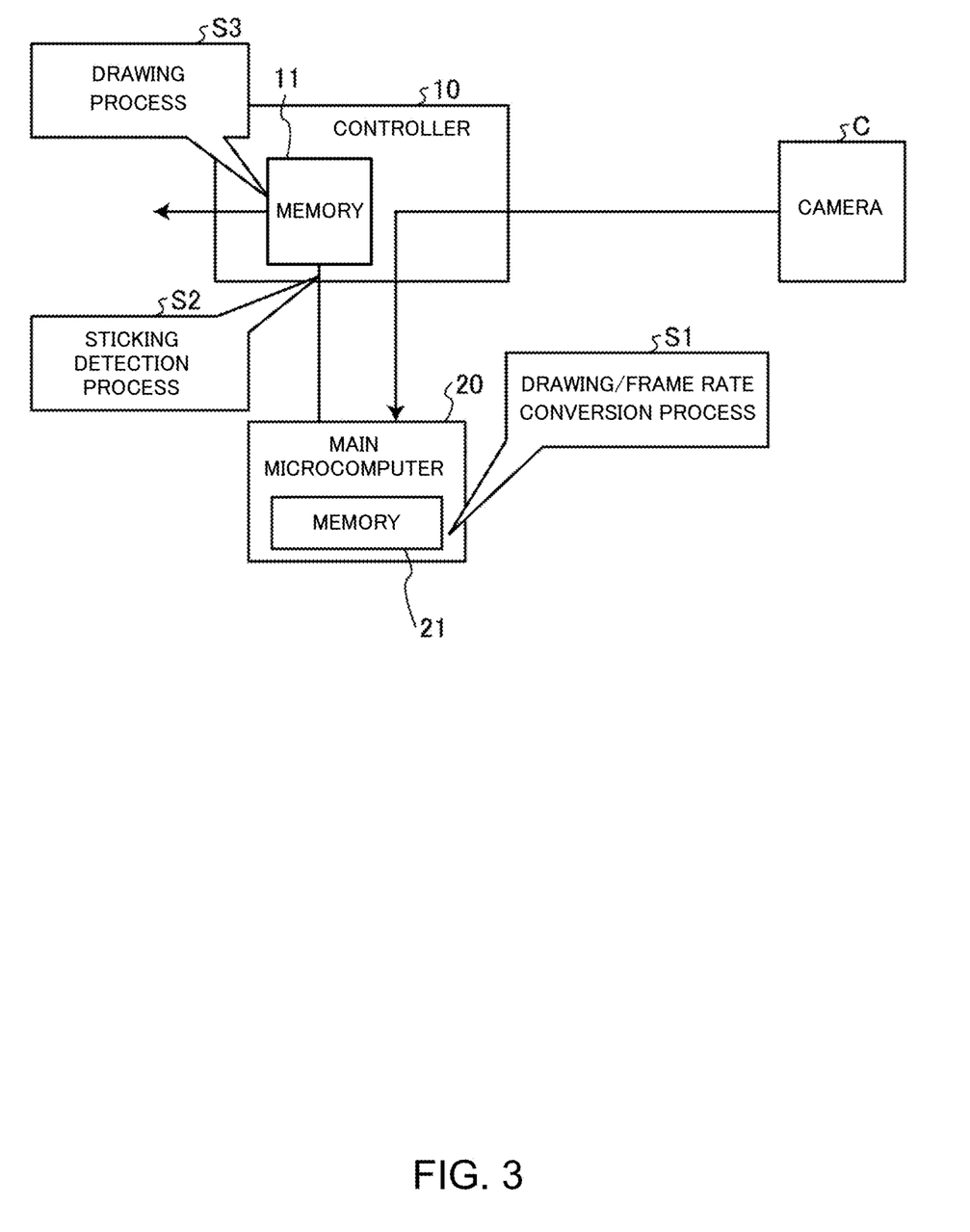
FIG. 3 is a schematic diagram illustrating a signal path of a normal camera video.

FIG. 3 is a schematic diagram illustrating the signal path of the normal camera video. A configuration of the video processing apparatus 1 will be simplified and described below.

As illustrated in FIG. 3, the video signal that has been output from the camera C is input to the main microcomputer 20 via the controller 10. The main microcomputer 20 performs a drawing/frame rate conversion process for the video signal using the memory 21 as a frame memory (a step S1). The frame memory refers to a memory with a capacity to store data of one frame of the video signal.

For example, the main microcomputer 20 draws by superimposing an auxiliary image that assists driving of the vehicle 100 on the video signal. For example, the main microcomputer 20 draws images of a predicted travelling track of the vehicle 100 according to a present steering angle, detection results of parking spaces and obstacles, and the like, as the auxiliary images.

The main microcomputer 20 converts a frame rate of the video signal to be input from the camera C into a frame rate for the display 40. For example, the main microcomputer 20 converts the video signal of 30 fps to be input from the camera C into the video signal of 60 fps for the display 40.

As described above, since the main microcomputer 20 converts the frame rate of the video signal to be input from the camera C into the frame rate for the display 40, the video signals having various frame rates are displayed on the display 40. That is, it is possible to enhance versatility of the camera C to be mounted in the in-vehicle camera system S.

When the video signal to be input from the camera C is an interlace signal, the main microcomputer 20 may also perform an I/P conversion process (i.e., converting the interlace signal into a non-interlace signal (progressive signal)). As a result, even when the display 40 only supports the non-interlace signal, the in-vehicle camera system S is equipped with the camera C in which the video signal is the interlace signal.

The main microcomputer 20 outputs the video signal after various image processing to the controller 10. The controller 10 performs a sticking detection process on the video signal to be input from the main microcomputer 20 (a step S2). Here, a state in which the video signal is stuck means a state in which the video signal to be input from the main microcomputer 20 to the controller 10 is not changed.

This is because, since the memory 21 of the main microcomputer 20 is the frame memory, when an abnormality occurs in the main microcomputer 20, the video signal that has been stored in the memory 21 before abnormality occurrence is continuously output.

Since the controller 10 detects sticking of the video signal to be input from the main microcomputer 20, the abnormality of the main microcomputer 20 is detected. Especially, since the video processing apparatus 1 displays surrounding situations of the vehicle 100 on the display 40, in the state in which the video signal is stuck, the video processing apparatus 1 displays a past video on the display 40. On the other hand, the controller 10 contributes to improvement in safety of the vehicle 100 by detecting the sticking of the video signal. In order to determine the abnormality of the main microcomputer 20, when the video signal to be input from the main microcomputer 20 is stopped, the controller 10 may determine that the abnormality occurs in the main microcomputer 20.

Subsequently, when the controller 10 determines that the video signal is not stuck as a result of sticking detection on the video signal, the controller 10 performs a drawing process (buffer process) for displaying the video signal on the display 40 using the memory 11 as a line memory (a step S3). Then, the controller 10 causes the display 40 to display the video signal after the drawing process. The line memory refers to a memory with a capacity to store data of one line of the video signal. As described later, the memory 11 is a memory with a capacity that is also used as the frame memory. The memory 11 uses a part of the capacity as the line memory. In this case, in the capacity of the memory, the remaining capacity that is not used as the line memory is usable for other processes of the controller 10.

Figure 4:
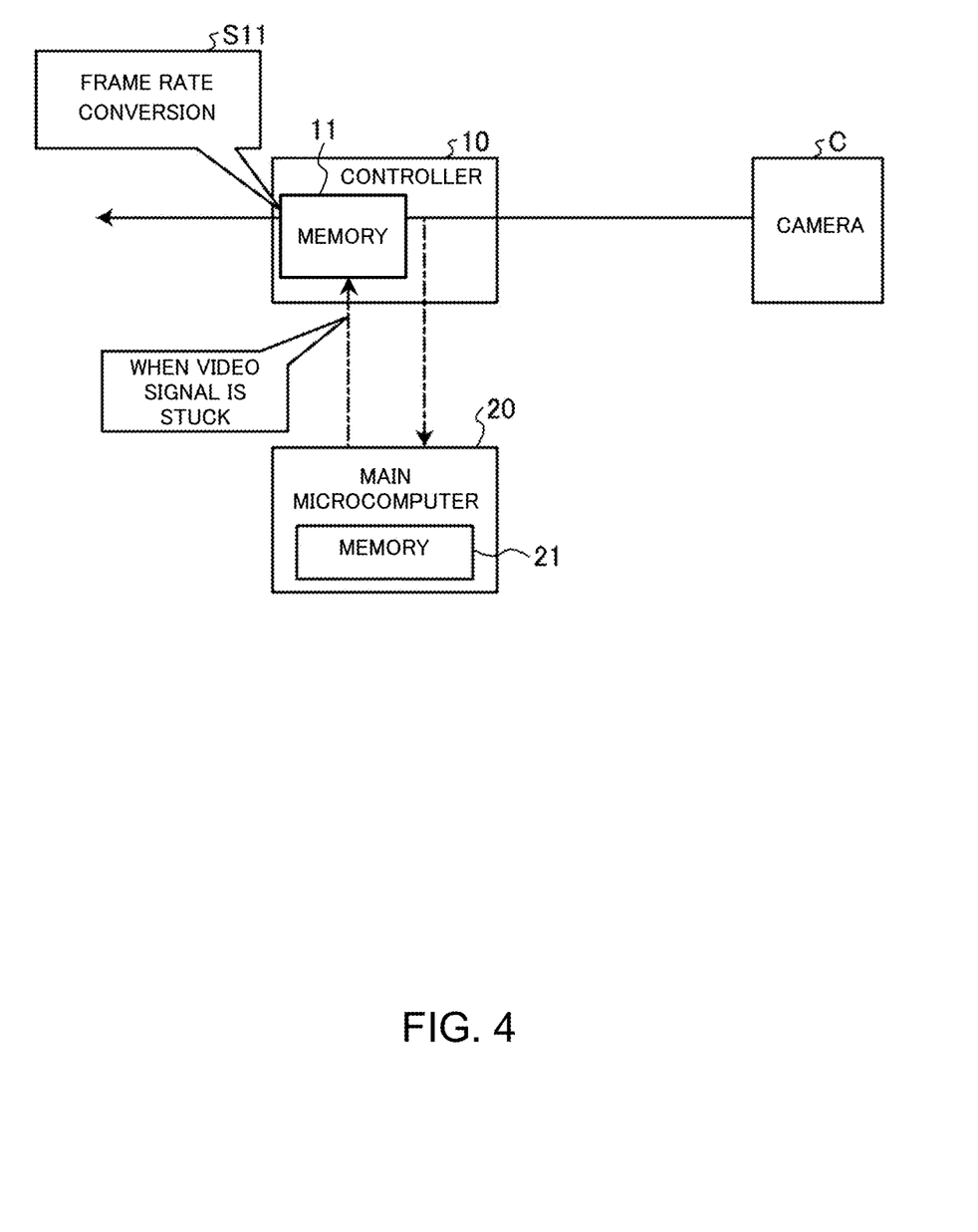
FIG. 4 is a schematic diagram illustrating a signal path of a bypass camera video.

Next, the signal path of the video signal in the abnormality of the main microcomputer 20 will be described with reference to FIG. 4. FIG. 4 is a schematic diagram illustrating the signal path of the bypass camera video. As illustrated in FIG. 4, when the abnormality occurs in the main microcomputer 20, that is, in the state in which the video signal is stuck, the controller 10 performs a frame rate conversion process of the video signal to be input from the camera C (a step S11).

More specifically, first, when the controller 10 detects the abnormality of the main microcomputer 20, the controller 10 switches the memory 11 from the line memory to the frame memory. The controller 10 switches the memory 11 from the line memory to the frame memory by increasing a use capacity of the memory 11 by register settings.

The controller 10 converts the frame rate of the video signal to be input from the camera C into the frame rate (e.g., 60 fps) for the display 40 by the frame memory, and causes the display 40 to display the video signal after conversion of the frame rate.

As a result, even when the abnormality occurs in the main microcomputer 20, the video processing apparatus 1 converts the frame rate in the controller 10. Thus, it is possible to display an appropriate video on the display.

Furthermore, since the controller 10 utilizes the memory 11 as both the line memory and the frame memory, the controller 10 effectively utilizes the memory 11. When a difference between a frame rate of the camera C and the frame rate for the display 40 is small, the controller 10 may perform conversion of the frame rate using the memory 11 as the line memory. The controller 10 may be provided with a memory for the line memory and a memory for the frame memory, respectively. The controller 10, for example, may further perform the sticking detection on the video signal after the conversion of the frame rate by the memory 11.

When switching the memory 11, the controller 10 temporarily stops output of the video signal to be output to the display 40, and restarts the output of the video signal after completion of the conversion of the frame rate. This is because, when switching the memory 11 from the line memory to the frame memory, in a case where the controller 10 continuously performs the output of the video signal, the video to be displayed on the display 40 is distorted.

During a period in which the output of the video signal from the controller 10 is stopped (a period in which the video signal is muted), a black screen is displayed on the display 40. That is, since the controller 10 temporarily stops the output of the video signal, the controller 10 suppresses distortion of the video. At this time, the controller 10 may notify switching of the video through voice and the like.

The controller 10 causes the display 40 to display the video signal whose frame rate has been converted into the frame rate for the display 40. At this time, the controller 10 causes the display 40 to display the video in a state in which the image processing has not been performed by the main microcomputer 20.

That is, when the abnormality occurs in the main microcomputer 20, the controller 10 causes the display 40 to display the bypass camera video on which the auxiliary image is not drawn. As a result, even when the abnormality occurs in the main microcomputer 20, the controller 10 causes the display 40 to continuously display the video.

When the video signal to be input from the camera C is the interlace signal, the controller 10 may also perform the I/P conversion process of converting the interlace signal into the non-interlace signal (progressive signal) by the memory 11 as the frame memory. As a result, even when the display 40 only supports the non-interlace signal, the in-vehicle camera system S is equipped with the camera C that uses the interlace signal as the video signal.

As described above, when the abnormality occurs in the main microcomputer 20, the controller 10 converts the frame rate of the video signal to be input from the camera into the frame rate for the display 40 without interposing the main microcomputer 20 and outputs the converted video signal to the display 40.

Since, when the abnormality occurs in the main microcomputer 20, the video processing apparatus 1 according to the embodiment performs a frame conversion in the controller 10, even when the abnormality occurs in the main microcomputer 20, the video processing apparatus 1 according to the embodiment causes the display 20 to display the appropriate video.

In a state in which the controller 10 displays the bypass camera video on the display 40, the controller 10 outputs the video signal to the main microcomputer 20 and continuously performs the sticking detection of the video signal to be output from the main microcomputer 20.

When the sticking of the video signal to be output from the main microcomputer 20 is restored, the controller 10 returns the video to be displayed on the display 40 to the normal camera video from the bypass camera video.

At this time, the controller 10 temporarily stops the video signal to be output to the display 40 and restarts the output of the video signal after returning the memory 11 to the line memory from the frame memory. That is, also when switching the video from the bypass camera video to the normal camera video, the black screen is temporarily displayed on the display 40. Thus, the controller 10 suppresses distortion of the video due to switching of the memory 11.

Figure 5:
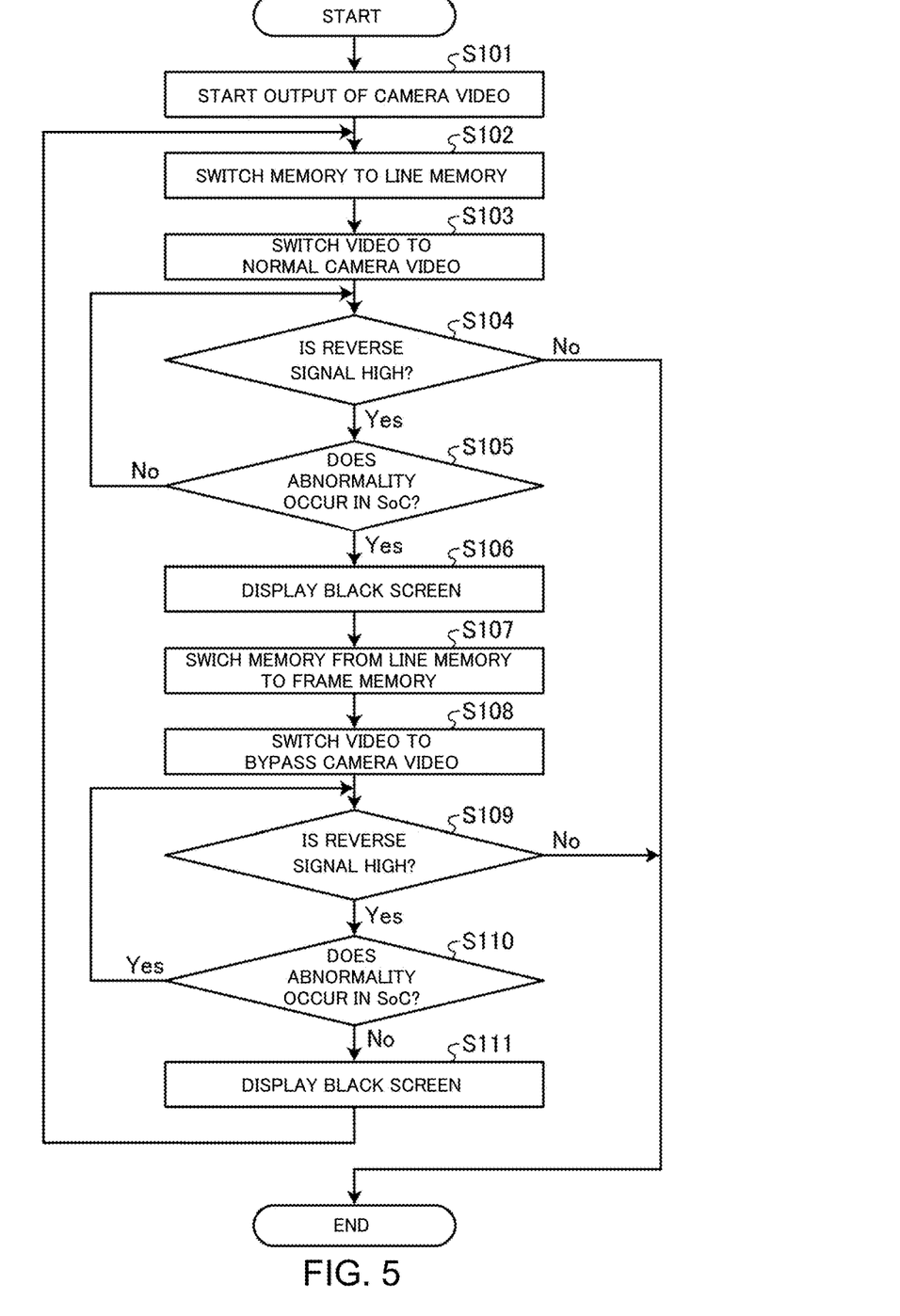
FIG. 5 is a flowchart illustrating a processing procedure executed by the video processing apparatus.

Next, a processing procedure executed by the video processing apparatus 1 according to the embodiment will be described with reference to FIG. 5. FIG. 5 is a flowchart illustrating the processing procedure executed by the video processing apparatus 1. When the reverse signal becomes high, the following process is started and while the reverse signal is high, the process is repeatedly executed by the controller 10.

As illustrated in FIG. 5, when the reverse signal becomes high and the process is started, the controller 10 first starts the output of the camera video to the display 40 instead of the videos (e.g., the videos of a navigation screen, a television screen, a DVD screen, an audio screen, etc.) that have been output to the display 40 so far (a step S101).

Subsequently, after switching the memory 11 to the line memory (a step S102), the controller 10 switches the video to the normal camera video (a step S103).

Subsequently, the controller 10 determines whether or not the reverse signal Rev is high (a step S104). When the controller 10 determines that the reverse signal Rev is high (Yes in the step S104), the controller 10 determines whether or not the abnormality occurs in the SoC (corresponding to the main microcomputer 20) (a step S105). That is, when the controller 10 determines that the video signal to be input from the main microcomputer 20 is stuck, the controller 10 determines that the abnormality occurs in the SoC.

When the controller 10 determines that the abnormality occurs in the SoC (Yes in the step S105), after displaying the black screen on the display 40 (a step S106), the controller 10 switches the memory 11 from the line memory to the frame memory (a step S107).

Subsequently, the controller 10 switches the video to be displayed on the display 40 to the bypass camera video (a step S108). Subsequently, the controller 10 determines whether or not the reverse signal Rev is high (a step S109). When the controller 10 determines that the reverse signal Rev is high (Yes in the step S109), the controller 10 further determines whether or not the abnormality occurs in the SoC (a step S110).

When the controller 10 does not determine that the abnormality occurs in the SoC (No in the step S110), the controller 10 displays the black screen on the display 40 (a step S111) and then moves to the process in the step S102.

When the controller 10 determines that the abnormality occurs in the Soc in the process of the step S110 (Yes in the step S110), that is, when the controller 10 determines that the abnormality continues to occur in the SoC, the controller 10 returns to the process of the step S109.

When the controller 10 determines that the reverse signal Rev is low in the steps S104 and S109 (No in the steps S104 and S109), the controller 10 ends the output of the camera video to display 40, starts the output of the videos (e.g., the videos of a navigation screen, a television screen, a DVD screen, an audio screen, etc.) that have been output to the display 40 before the camera video to the display 40 instead, and ends the process. When the controller 10 determines that there is no abnormality in the SoC in the step S105 (No in the step S105), the controller 10 returns to the process of the step S104.

As described above, the video processing apparatus 1 according to the embodiment includes: the main microcomputer 20 that draws by superimposing the auxiliary image that assists driving of the vehicle on the first video signal to be input from the camera C, and converts the frame rate of the video signal on which the image has been drawn into the frame rate for the display 40 to output the converted video signal as the second video signal; and the controller 10 that outputs the second video signal to be output from the main microcomputer 20 to the display 40. When the second video signal is not output from the main microcomputer 20, or the second video signal to be output from the main microcomputer 20 is not updated, the controller 10 converts a frame rate of the first video signal into the frame rate for the display and outputs the converted video signal to the display 40.

Therefore, even when the abnormality occurs in the main microcomputer 20, since the video processing apparatus 1 according to the embodiment converts the frame rate in the controller 10, the video processing apparatus 1 causes the display 40 to display the appropriate video.

By the way, in the embodiment described above, a case in which when the abnormality occurs in the main microcomputer 20, the bypass camera video is displayed on the display 40 has been described, but the invention is not limited thereto. For example, when the abnormality occurs in the main microcomputer 20, the controller 10 may stop the video signal to be output to the display 40 and display the black screen on the display 40.

When the abnormality occurs in the main microcomputer 20, the video processing apparatus 1 may switch between a function of displaying the bypass camera video and a function of stopping the video signal to be output to the display 40 by user settings, and the like.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:
1. A video processing apparatus comprising:
a microcomputer configured to (i) superimpose an image that assists driving of a vehicle on a first video signal input from a camera, (ii) convert a frame rate of the first video signal into a second frame rate for a display, and (iii) output the first video signal after performing (i) and (ii) as a second video signal; and
a controller configured to
receive the first video signal from the camera and receive the second video signal from the microcomputer,
in a first case in which the second video signal is input to the controller, the controller outputting the second video signal to the display, and
in a second case in which the second video signal is not input to the controller or not updated, the controller converting the frame rate of the first video signal received from the camera into the second frame rate for the display to output a converted first video signal to the display, wherein
when the first video signal input from the camera is an interlace signal, the microcomputer converts the interlace signal into a non-interlace signal to output the converted video signal as the second video signal,
in response to the second video signal being not output from the microcomputer to the controller, or the second video signal output from the microcomputer being not updated, the controller converts the first video signal into the non-interlace signal to output the converted first video signal to the display,
the controller includes a memory,
in response to the second video signal being output from the microcomputer, the controller uses the memory as a line memory and outputs the second video signal to the display via the line memory, and
in response to the second video signal not being output from the microcomputer, or in response to the second video signal output from the microcomputer not being updated, the controller uses the memory as a frame memory and converts the first video signal into the non-interlace signal to output the converted first video signal to the display.
2. The video processing apparatus according to claim 1, wherein
when switching between a state in which the second video signal is output to the display and a state in which the converted first video signal is output to the display, the controller temporarily stops outputting the second video signal or the converted first video signal to the display.

3. The video processing apparatus according to claim 1, wherein
the camera is installed so as to capture an image around the vehicle, and
in response to the second video signal not being output from the microcomputer, or in response to the second video signal output from the microcomputer not being updated, the controller outputs the first video signal on which an image that assists driving of the vehicle is not superimposed to the display.

4. An in-vehicle camera system comprising:
a camera configured to capture an image around a vehicle;
a video processing apparatus; and
an in-vehicle display configured to display a video input from the video processing apparatus, wherein
the video processing apparatus includes:
a microcomputer configured to (i) superimpose an image that assists driving of a vehicle on a first video signal input from the camera, (ii) convert a frame rate of the first video signal into a second frame rate for the in-vehicle display, and (iii) output the first video signal after performing (i) and (ii) as a second video signal; and
a controller configured to output either the first video signal or the second video signal to the in-vehicle display, wherein
in response to the second video signal being output from the microcomputer, the controller outputs the second video signal to the in-vehicle display,
in response to the second video signal not being output from the microcomputer, or in response to the second video signal output from the microcomputer not being updated, the controller converts the frame rate of the first video signal received from the camera into the second frame rate for the in-vehicle display to output a converted first video signal to the in-vehicle display,
when the first video signal input from the camera is an interlace signal, the microcomputer converts the interlace signal into a non-interlace signal to output the converted video signal as the second video signal,
in response to the second video signal being not output from the microcomputer to the controller, or the second video signal output from the microcomputer being not updated, the controller converts the first video signal into the non-interlace signal to output the converted first video signal to the in-vehicle display,
the controller includes a memory,
in response to the second video signal being output from the microcomputer, the controller uses the memory as a line memory and outputs the second video signal to the in-vehicle display via the line memory, and
in response to the second video signal not being output from the microcomputer, or in response to the second video signal output from the microcomputer not being updated, the controller uses the memory as a frame memory and converts the first video signal into the non-interlace signal to output the converted first video signal to the in-vehicle display.

5. A video processing method executed by a microcomputer and a controller, the method comprising:
(a) performing, by the microcomputer, (i) superimposing an image that assists driving of a vehicle on a first video signal input from a camera, (ii) converting a frame rate of the first video signal into a second frame rate for a display, and (iii) outputting the first video signal after performing (i) and (ii) as a second video signal;
(b) in response to the second video signal being output from the microcomputer, outputting, by the controller, the second video signal to the display; and
(c) in response to the second video signal not being output from the microcomputer, or in response to the second video signal output from the microcomputer not being updated, converting, by the controller, the frame rate of the first video signal received from the camera into the second frame rate for the display to output a converted first video signal to the display, wherein
when the first video signal input from the camera is an interlace signal, the microcomputer converts the interlace signal into a non-interlace signal and outputs the converted video signal as the second video signal,
in response to the second video signal being not output from the microcomputer to the controller, or the second video signal output from the microcomputer being not updated, the controller converts the first video signal into the non-interlace signal and outputs the converted first video signal to the display,
the controller includes a memory,
in response to the second video signal being output from the microcomputer, the controller uses the memory as a line memory and outputs the second video signal to the display via the line memory, and
in response to the second video signal not being output from the microcomputer, or in response to the second video signal output from the microcomputer not being updated, the controller uses the memory as a frame memory and converts the first video signal into the non-interlace signal to output the converted first video signal to the display.

* * * * *